(12) United States Patent
Hamrock et al.

(10) Patent No.: US 7,348,088 B2
(45) Date of Patent: *Mar. 25, 2008

(54) POLYMER ELECTROLYTE MEMBRANE

(75) Inventors: Steven Joseph Hamrock, Stillwater, MN (US); Linda Mae Rivard, Stillwater, MN (US); George Gower Innes Moore, Afton, MN (US); Harold Todd Freemyer, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/325,278

(22) Filed: Dec. 19, 2002

(65) Prior Publication Data

US 2004/0121210 A1 Jun. 24, 2004

(51) Int. Cl.
*H01M 8/10* (2006.01)

(52) U.S. Cl. .............................. 429/33; 429/30; 521/27

(58) Field of Classification Search .................. 521/27; 429/33, 30
See application file for complete search history.

(56) References Cited

U.S. PATENT DOCUMENTS

| | | |
|---|---|---|
| 2,732,398 A | 1/1956 | Brice et al. |
| 3,114,778 A | 12/1963 | Gerhard et al. |
| 3,250,608 A | 5/1966 | Griffith |
| 3,250,808 A | 5/1966 | Moore, Jr. et al. |
| 3,282,875 A | 11/1966 | Connolly et al. |
| 3,291,843 A | 12/1966 | Fritz et al. |
| 3,301,893 A | 1/1967 | Putnam et al. |
| 3,311,658 A | 3/1967 | Warnell |
| 3,450,684 A | 6/1969 | Darby |
| 3,560,568 A | 2/1971 | Resnick |
| 4,329,434 A | 5/1982 | Kimoto et al. |
| 4,329,435 A | 5/1982 | Kimoto et al. |
| 4,330,654 A | 5/1982 | Ezzell et al. |
| 4,332,954 A | 6/1982 | Koshar |
| 4,337,137 A | 6/1982 | Ezzell |
| 4,340,750 A | 7/1982 | Yamabe et al. |
| 4,358,412 A | 11/1982 | Ezzell et al. |
| 4,358,545 A * | 11/1982 | Ezzell et al. .................. 521/27 |
| 4,417,969 A | 11/1983 | Ezzell et al. |
| 4,425,199 A | 1/1984 | Hamada et al. |
| 4,466,881 A | 8/1984 | Hamada et al. |
| 4,510,328 A | 4/1985 | Kimoto et al. |
| 4,511,518 A | 4/1985 | Kimoto et al. |
| 4,536,352 A | 8/1985 | Kimoto et al. |
| 4,554,112 A | 11/1985 | Ezzell et al. |
| 4,555,369 A | 11/1985 | Kimoto et al. |
| 4,597,913 A | 7/1986 | Kimoto et al. |
| 4,613,467 A | 9/1986 | Kimoto et al. |
| 4,749,526 A | 6/1988 | Flynn |
| 4,834,922 A | 5/1989 | Ezzell et al. |
| 4,997,988 A | 3/1991 | Roberts et al. |
| 5,103,051 A | 4/1992 | Navarrini et al. |
| 5,241,110 A | 8/1993 | Navarrini et al. |
| 5,318,674 A | 6/1994 | Behr et al. |
| 5,902,908 A | 5/1999 | Morita et al. |
| 6,255,536 B1 | 7/2001 | Worm et al. |
| 6,388,139 B1 | 5/2002 | Resnick |
| 7,060,738 B2 * | 6/2006 | Jing et al. .................. 522/187 |
| 2005/0095487 A1 * | 5/2005 | Hamrock et al. ............. 429/33 |

FOREIGN PATENT DOCUMENTS

| | | |
|---|---|---|
| EP | 0 041 733 A1 | 12/1981 |
| EP | 0 066 369 A1 | 12/1982 |
| EP | 0 606 842 A1 | 7/1994 |
| JP | 58-93728 | 6/1983 |
| WO | WO 86/06879 A1 | 11/1986 |
| WO | WO 86/07075 A1 | 12/1986 |
| WO | WO 94/03503 A2 | 2/1994 |
| WO | WO 97/09373 A1 | 3/1997 |

OTHER PUBLICATIONS

Eisman, G. A., "The Application Of Dow Chemical's Perfluorinated Membranes in Proton-Exchange Membrane Fuel Cells", *Journal of Power Sources*, Elsevier Sequoia S. A., Lausanne, CH, vol. 29, No. 3/4, Feb. 1, 1990, pp. 389-398.

* cited by examiner

*Primary Examiner*—Bruce F. Bell
(74) *Attorney, Agent, or Firm*—Philip Y. Dahl

(57) ABSTRACT

A polymer electrolyte membrane is provided having a thickness of 90 microns or less and comprising a polymer, said polymer comprising a highly fluorinated backbone and recurring pendant groups according to the formula:

$$YOSO_2-CF_2-CF_2-CF_2-CF_2-O-[\text{polymer backbone}] \quad (I)$$

where Y is $H^+$ or a monovalent cation such as an alkali metal cation. Typically, the membrane is a cast membrane. Typically, the polymer has a hydration product of greater than 22,000. Typically, the polymer has an equivalent weight of 800-1200.

19 Claims, No Drawings

POLYMER ELECTROLYTE MEMBRANE

FIELD OF THE INVENTION

This invention relates to a thin polymer electrolyte membrane for use in electrolytic cells such as fuel cells comprising a polymer having a highly fluorinated backbone and recurring pendant groups according to the formula:

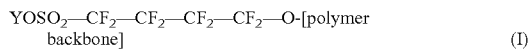
$$\text{YOSO}_2\text{—CF}_2\text{—CF}_2\text{—CF}_2\text{—CF}_2\text{—O-[polymer backbone]} \quad (I)$$

where Y is H$^+$ or a monovalent cation, such as an alkali metal cation, where the polymer achieves high hydration product at increased equivalent weight.

BACKGROUND OF THE INVENTION

Copolymers of tetrafluoroethylene (TFE) and a co-monomer according to the formula: FSO$_2$—CF$_2$—CF$_2$—O—CF(CF$_3$)—CF$_2$—O—CF=CF$_2$ are known and sold in sulfonic acid form, i.e., with the FSO$_2$— end group hydrolyzed to HSO$_3$—, under the trade name Nafion® by DuPont Chemical Company, Wilmington, Del. Nafion® is frequently used to make polymer electrolyte membranes for use in fuel cells.

U.S. Pat. Nos. 4,358,545 and 4,417,969 disclose polymers and ion exchange membranes thereof having a hydration product of less than about 22,000 and equivalent weight of 800-1500, which have a substantially fluorinated backbone and pendant groups according to the formula: YSO$_3$—(CFR$_f$)$_a$(CFR'$_f$)$_b$—O-backbone, where Y is hydrogen or an alkali metal, R$_f$ and R'$_f$ are halogen or substantially fluorinated alkyl groups, a is 0-3, b is 0-3, and a+b is at least 1.

Kokai Patent Application No. SHO 58-93728 discloses at Example 3 the copolymerization of TFE and FSO$_2$—CF$_2$—CF$_2$—CF$_2$—CF$_2$—O—CF=CF$_2$. The resulting polymer is extrusion molded to produce a film with a thickness of 150 microns and hydrolyzed, the resulting membrane having an equivalent weight of 990. This film was further treated so as to convert sulfonic acid groups to carboxylic acid groups in a thin surface layer of one side of the membrane.

SUMMARY OF THE INVENTION

Briefly, the present invention provides a polymer electrolyte membrane having a thickness of 90 microns or less comprising a polymer having a highly fluorinated backbone and recurring pendant groups according to the formula:

$$\text{YOSO}_2\text{—CF}_2\text{—CF}_2\text{—CF}_2\text{—CF}_2\text{—O-[polymer backbone]} \quad (I)$$

where Y is H$^+$ or a monovalent cation such as an alkali metal cation. Typically, the membrane is a cast membrane. Typically, the polymer has a hydration product of greater than 22,000. Typically, the polymer has an equivalent weight of between 800 and 1200.

What has not been described in the art, and is provided by the present invention, is a thin polymer electrolyte membrane for use in electrolytic cells such as fuel cells comprising a polymer according to the above formula which achieves high hydration product at increased equivalent weight.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

It is an advantage of the present invention to provide a strong, thin and effective polymer electrolyte membrane for use in electrolytic cells such as fuel cells. The polymer electrolyte membrane according to the present invention comprises a polymer which is an effective ion conductor, i.e., a polymer having high hydration product, which also has a relatively high equivalent weight and therefore good mechanical properties.

DETAILED DESCRIPTION OF PREFERRED EMBODIMENTS

The present invention provides a polymer electrolyte membrane having a thickness of 90 microns or less comprising a polymer having a highly fluorinated backbone and recurring pendant groups according to the formula:

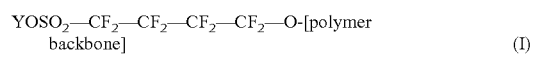
$$\text{YOSO}_2\text{—CF}_2\text{—CF}_2\text{—CF}_2\text{—CF}_2\text{—O-[polymer backbone]} \quad (I)$$

where Y is H$^+$ or another monovalent cation, such as an alkali metal cation. Typically, the membrane is a cast membrane. Typically, the polymer has a hydration product of greater than 22,000. Typically, the polymer has an equivalent weight of between 800 and 1200.

The membrane according to the present invention has a thickness of 90 microns or less. More typically, the membrane has a thickness of 60 microns or less and most typically 30 microns or less. A thinner membrane may provide less resistance to the passage of ions. In fuel cell use, this results in cooler operation and greater output of usable energy. Thinner membranes must be made of materials that maintain their structural integrity in use.

The membrane according to the present invention is made of a polymer having a highly fluorinated backbone, typically a perfluorinated backbone. Recurring pendant groups are attached to the backbone, according to the formula:

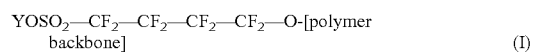
$$\text{YOSO}_2\text{—CF}_2\text{—CF}_2\text{—CF}_2\text{—CF}_2\text{—O-[polymer backbone]} \quad (I)$$

where Y is most typically H$^+$ but may also be another monovalent cation, typically an alkali metal cation, more typically Na$^+$. Other pendant groups, such as perfluoroalkyl groups or perfluoroalkyl ether groups may be present. Typically substantially all of the pendant groups are according to formula (I) and more typically all of the pendant groups are according to formula (I).

The polymer is typically made by the copolymerization of tetrafluoroethylene with a comonomer according to the formula:

$$\text{FSO}_2\text{—CF}_2\text{CF}_2\text{CF}_2\text{CF}_2\text{—O—CF=CF}_2$$

Additional comonomers may be added to provide perfluoroalkyl or perfluoroalkyl ether pendant groups in the final polymer. Vinylidene fluoride may also be used as a monomer. Polymerization can be accomplished by any suitable method, including aqueous emulsion polymerization. The fluorosulfonyl group is hydrolyzed to a sulfonate or sulfonic acid group prior to use of the polymer as an ion conducting membrane.

The polymer has a hydration product (HP) of greater than 22,000, more typically greater than 23,000, more typically greater than 24,000, and most typically greater than 25,000. In general, higher HP correlates with higher ionic conductance.

The polymer typically has an equivalent weight (EW) of greater than 800, more typically greater than 900, more typically greater than 1000. The polymer typically has an equivalent weight (EW) of less than 1200, more typically less than 1100. Lower EW generally correlates with weaker mechanical properties when the membrane is hydrated, as it is in use, due to lower levels of crystallinity. It is an advantage of the polymer according to the present invention to achieve high HP at ordinary or relatively high EW. In addition, higher EW correlates with lower cost, since tetrafluoroethylene is generally less expensive than the functional copolymer.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher.

This invention is useful in the manufacture of electrolytic cells such as polymer electrolyte membrane fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Polymer

Tetrafluoroethylene (TFE) and $FSO_2$—$CF_2CF_2CF_2CF_2$—O—CF=$CF_2$ (Comonomer A) were copolymerized in a number of 4 liter runs by aqueous emulsion polymerization. Comonomer A was made according to the procedures disclosed in co-pending U.S. patent applications Ser. No. 10/322,254 and Ser. No. 10/322,226, incorporated herein by reference. Polymerization was performed by first making a pro-emulsion of Comonomer A in water with ammonium perfluorooclanoate (APFO) as an emulsifier by high shear mixing using an Ultraturrax agitator. The pre-emulsion was then reacted with TFE with addition of an initiator. Equivalent Weight (EW) was measured for the polymeric product of each run by examination of polymer samples in 19F SS NMR. Hydration Product (H-P) was measured for membranes made from the polymer of each run, as discussed below. Table I reports EW and HP for six runs according to the present invention.

TABLE I

| Run | EW | HP |
| --- | --- | --- |
| 1 | 858 | 42,200 |
| 2 | 956 | 40,700 |
| 3 | 960 | 27,500 |
| 4 | 975 | 27,400 |
| 5 | 1032 | 24,200 |
| 6 | 1189 | 25,100 |

Polymer electrolyte membranes were made from the polymer of each of runs 1-6.

Membrane

The polymer was mixed with 5 equivalents of LiOH (based on sulfonyl fluoride concentration) and enough water to make a 20% polymer solids mixture. This mixture was heated to 250° C. for four hours. Most (>95%) of the polymer became dispersed under these conditions. The dispersions were filtered to remove LiF and undispersed polymer, and then ion exchanged on Mitsubishi Diaion SKT10L ion exchange resin to give the acid form of the ionomer. The resulting mixture was an acid dispersion at 18 to 19% polymer solids. ICP analyses on representative samples showed Li concentrations to be below 50 ppm. This dispersion was concentrated in vacu to about 38% solids and then mixed with n-propanol to give the desired 20% solids dispersion in a water/n-propanol solvent mixture of about 40% water/60% n-propanol. This base dispersion was used to cast membranes.

Membranes (handspreads) were prepared by casting the dispersion prepared above at 20 mils (508 microns) wet thickness onto a glass plate. These castings were dried for 10 minutes at 90° C., then annealed for 10 minutes at 200° C. After cooling, the membranes were removed from the glass by placing the glass plate into water. The membranes were about 1.2 mils (30 microns) thick when dry.

Hydration Experiments

Membrane samples were weighed, boiled in water for 30 minutes, removed from the boiling water and equilibrated in RT water for 5 minutes. They were then removed from the water, immediately patted dry with a paper towel, and re-weighed. The hydration product was calculated as the number of equivalents of water absorbed per equivalent of sulfonic acid group multiplied by the EW of the polymer.

Fuel Cell Testing

A membrane of the polymer of run 4 was used to manufacture a membrane electrode assembly (MEA) substantially according to methods described in U.S. patent application Ser. No. 10/224,848 filed Aug. 21, 2002. For comparison, a similar membrane of Nafion® was used to manufacture a comparative MEA Each MEA was mounted in a test cell station (Fuel Cell Technologies, Inc., Albuquerque, N.M.). The test station includes a variable electronic load with separate anode and cathode gas handling systems to control gas flow, pressure, and humidity. The electronic load and gas flows are computer controlled. Fuel cell polarization curves were obtained under the following test parameters: electrode area of 50 cm$^2$; cell temperature of 70° C., anode gas pressure of 0 psig; anode gas flow rate at 800 standard cc/min; cathode gas pressure of 0 psig; cathode flow rate at 1800 standard cc/min. Humidification of the cathode and anode was provided by steam injection (injector temperature of 120° C.) and equilibrating overnight to 100% RH at the anode and cathode. Each fuel cell was brought to operating conditions at 70° C. under hydrogen and air flows and test protocols were initiated after 12 hours of operation. Performance of the MEA made with the membrane of the present invention was nearly equal to that of the control MEA.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A polymer electrolyte membrane having a thickness of 90 microns or less comprising a polymer, said polymer comprising a highly fluorinated backbone and pendant groups according to the formula:

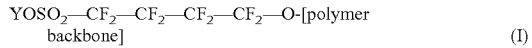
$$YOSO_2-CF_2-CF_2-CF_2-CF_2-O\text{-[polymer backbone]} \quad (I)$$

where Y is $H^+$ or a monovalent cation.

2. The polymer electrolyte membrane according to claim 1 which is a cast membrane.

3. The polymer electrolyte membrane according to claim 2 having a thickness of 30 microns or less.

4. The polymer electrolyte membrane according to any of claims 1-3 wherein said polymer has a hydration product of greater than 22,000.

5. The polymer electrolyte membrane according to claim 4 wherein said polymer has an equivalent weight of between 800 and 1200.

6. The polymer electrolyte membrane according to claim 4 wherein said polymer has an equivalent weight of between 900 and 1100.

7. The polymer electrolyte membrane according to claim 4 wherein said polymer has an equivalent weight of between 1000 and 1100.

8. The polymer electrolyte membrane according to any of claims 1-3 wherein said polymer has a hydration product of greater than 23,000.

9. The polymer electrolyte membrane according to claim 8 wherein said polymer has an equivalent weight of between 800 and 1200.

10. The polymer electrolyte membrane according to claim 8 wherein said polymer has an equivalent weight of between 900 and 1100.

11. The polymer electrolyte membrane according to claim 8 wherein said polymer has an equivalent weight of between 1000 and 1100.

12. The polymer electrolyte membrane according to any of claims 1-3 wherein said polymer has a hydration product of greater than 24,000.

13. The polymer electrolyte membrane according to claim 12 wherein said polymer has an equivalent weight of between 800 and 1200.

14. The polymer electrolyte membrane according to claim 12 wherein said polymer has an equivalent weight of between 900 and 1100.

15. The polymer electrolyte membrane according to claim 12 wherein said polymer has an equivalent weight of between 1000 and 1100.

16. The polymer electrolyte membrane according to any of claims 1-3 wherein said polymer has an equivalent weight of between 800 and 1200.

17. The polymer electrolyte membrane according to any of claims 1-3 wherein said polymer has an equivalent weight of between 900 and 1100.

18. The polymer electrolyte membrane according to any of claims 1-3 wherein said polymer has an equivalent weight of between 1000 and 1100.

19. A membrane electrode assembly comprising the polymer electrolyte membrane according to any of claims 1-3.

* * * * *

UNITED STATES PATENT AND TRADEMARK OFFICE
CERTIFICATE OF CORRECTION

PATENT NO. : 7,348,088 B2 Page 1 of 1
APPLICATION NO. : 10/325278
DATED : March 25, 2008
INVENTOR(S) : Steven J. Hamrock et al.

It is certified that error appears in the above-identified patent and that said Letters Patent is hereby corrected as shown below:

Column 3
Line 45; delete "pro-emulsion" and insert -- pre-emulsion -- therefore.
Line 46; delete "perfluorooclanoate" and insert -- perfluorooctanoate -- therefore.
Line 51; delete "(H-P)" and insert -- (HP) -- therefore.

Signed and Sealed this

Nineteenth Day of August, 2008

JON W. DUDAS
*Director of the United States Patent and Trademark Office*